United States Patent
Mirho (10) Patent No.: US 10,140,760 B1
(45) Date of Patent: Nov. 27, 2018

(54) METHOD AND SYSTEM FOR CONSISTENT IDENTIFICATION OF NUMBERED ELEMENTS IN MULTIPLE LAYERED VIEWS CAPTURED FROM A 3D MODEL

(71) Applicant: TurboPatent Inc., Seattle, WA (US)

(72) Inventor: Charles A Mirho, Lake Oswego, OR (US)

(73) Assignee: TurboPatent Inc., Seattle, WA (US)

( * ) Notice: Subject to any disclaimer, the term of this patent is extended or adjusted under 35 U.S.C. 154(b) by 122 days.

(21) Appl. No.: 15/429,127

(22) Filed: Feb. 9, 2017

Related U.S. Application Data (60) Provisional application No. 62/293,198, filed on Feb. 9, 2016.

(51) Int. Cl.
  *G06T 17/20* (2006.01)
  *G06T 15/40* (2011.01)

(52) U.S. Cl.
  CPC .............. *G06T 17/20* (2013.01); *G06T 15/40* (2013.01); *G06T 2200/24* (2013.01)

(58) Field of Classification Search
  CPC ................................. G06T 17/20; G06T 15/40
  See application file for complete search history.

(56) References Cited

U.S. PATENT DOCUMENTS

| | | | | |
|---|---|---|---|---|
| 9,836,882 | B2 * | 12/2017 | Freund | G06T 11/001 |
| 2009/0141020 | A1 * | 6/2009 | Freund | G06T 11/001 |
| | | | | 345/419 |
| 2017/0193694 | A1 * | 7/2017 | Freund | G06T 11/001 |

* cited by examiner

*Primary Examiner* — Said Broome
*Assistant Examiner* — Jonathan M Cofino
(74) *Attorney, Agent, or Firm* — FSP LLC (57) ABSTRACT

A method for consistent identification of numbered elements in multi-layered views captured from a 3D model may include generating a three dimensional (3D) model in a 3D model viewer displayed through a machine display through operation of a 3D modeler, configuring a feature mapper with a model feature definition to define at least one subregion of the 3D model as a model feature; mapping the model feature to a feature identifier in a mapping; generating an edge wireframe projection of a model view of the 3D model; determining visible sub-regions associated with model features in the edge wireframe projection; applying the edge wireframe projection to a background layer of a technical drawing; and rendering the feature identifier with a lead line originating from visible sub-regions on a defined feature foreground layer of the technical drawing.

9 Claims, 8 Drawing Sheets

METHOD AND SYSTEM FOR CONSISTENT IDENTIFICATION OF NUMBERED ELEMENTS IN MULTIPLE LAYERED VIEWS CAPTURED FROM A 3D MODEL

CROSS-REFERENCE TO RELATED APPLICATIONS

This application claims priority and benefit of U.S. Application Ser. No. 62/293,198, titled "method AND SYSTEM FOR CONSISTENT IDENTIFICATION OF NUMBERED ELEMENTS IN MULTIPLE LAYERED VIEWS CAPTURED FROM A 3D model", filed on Feb. 9, 2016 and incorporated herein by reference in its entirety.

BACKGROUND

Three-dimensional models may be made using a variety of tools with various integrated features. However, users often require two-dimensional drawings that conform to pre-determined specifications. While the 3D model maker may be updated to include the additional feature, tools may already exist to conform two-dimensional drawings to pre-determined specifications. Integrating the 3D model maker with existing drawing tools would increase the versatility of of the 3D model by utilizing the existing tool. Additional machine controls would be necessary to ensure the two tools produce two-dimensional drawings that conform to the pre-determined specifications.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Description

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Programmable device" in this context refers to an integrated circuit designed to be configured and/or reconfigured after manufacturing. The term "programmable processor" is another name for a programmable device herein. Programmable devices may include programmable processors, such as field programmable gate arrays (FPGAs), configurable hardware logic (CHL), and/or any other type programmable devices. Configuration of the programmable device is generally specified using a computer code or data such as a hardware description language (HDL), such as for example Verilog, VHDL, or the like. A programmable device may include an array of programmable logic blocks and a hierarchy of reconfigurable interconnects that allow the programmable logic blocks to be coupled to each other according to the descriptions in the HDL code. Each of the programmable logic blocks may be configured to perform complex combinational functions, or merely simple logic gates, such as AND, and XOR logic blocks. In most FPGAs, logic blocks also include memory elements, which may be simple latches, flip-flops, hereinafter also referred to as "flops," or more complex blocks of memory. Depending on the length of the interconnections between different logic blocks, signals may arrive at input terminals of the logic blocks at different times.

"Software" in this context refers to logic implemented as processor-executable instructions in a machine memory (e.g. read/write volatile or nonvolatile memory or media).

A user operating in one cloud may begin to operate a feature located in another cloud. One specific application would allow a user to use a 3D modeler to label a detailed 3D model. The labeled 3D model may then be converted to a two-dimensional view, while retaining any labeling of aspects of the 3D model visible in the two-dimensional view.

A method for consistent identification of numbered elements in multi-layered views captured from a 3D model may include generating a three dimensional (3D) model in a 3D model viewer displayed through a machine display through operation of a 3D modeler configured by a 3D model control from a user interface controller; configuring a feature mapper with a model feature definition from the user interface controller to define at least one sub-region of the 3D model as a model feature; mapping the model feature to a feature identifier in a mapping table through operation of the feature mapper controlled by the model feature definition; generating an edge wireframe projection of a model view of the 3D model through operation of an output controller configured by an export control received through the user interface controller; determining visible sub-regions associated with model features in the edge wireframe projection through a projection view filter configured with a hidden line removal algorithm; applying the edge wireframe projection to a background layer of a technical drawing displayed through the machine display through operation of a technical drawings viewer; and rendering the feature identifier with a lead line originating from at least one visible sub-region corresponding to an associated model feature in a visible features list on a defined feature foreground layer of the technical drawing through operation of the technical drawings viewer.

The method for consistent identification of numbered elements in multi-layered views captured from a 3D model may generate the 3D model in the 3D model viewer comprises retrieving the 3D model from a controlled memory data structure through operation of the 3D modeler configured by the 3D model control on a first cloud.

The method for consistent identification of numbered elements in multi-layered views captured from a 3D model may include the controlled memory data structure comprising a cloud storage controlled memory data structure.

The method for consistent identification of numbered elements in multi-layered views captured from a 3D model may apply the edge wireframe projection to the background layer of the technical drawing comprises configuring the technical drawings viewer on a second cloud to receive the visible features list and the edge wireframe projection from the first cloud.

In some embodiments, the hidden line removal algorithm may be operated by determining projected two dimensional boundaries for the model view through projection calculations performed by the projection view filter; filtering out the model features in the mapping table associated with sub-regions outside of the projected two dimensional boundaries generating a first pass feature list; identifying the model features of the first pass feature list with projected sub-regions surrounded by projected edge lines of the 3D model; determining orthogonal distances to projection plane of sub-regions associated with the projected sub-regions and of edge lines associated with the projected edge lines surrounding the projected sub-regions; and filtering out the model features from the first pass feature list associated with the projected sub-regions with the orthogonal distances to the projection plane, greater than the projected edge lines surrounding them generating the visible features list.

In some embodiments, the operations control may include instructions to operate a 3D modeler in a 3D model viewer to define one or more features of a 3D model.

In some embodiments, such a method may further include sending an output control to the second cloud.

In some embodiments, the two-dimensional view may include a visible edge wireframe.

In some embodiments, the 3D model may include one or more objects.

In some embodiments, the one or more features of the 3D model may include one or more numbers related to one or more of the one or more objects.

In some embodiments, the machine display further displays the one or more features of the 3D model.

In some embodiments, the 3D model viewer may refer to logic to display a graphical projection of a 3D model in a graphical user interface by controlling a projection plane to receive 3D views of the model within a 3D virtual environment. the 3D model viewer may allow for the manipulation of 3D objects within the 3D virtual environment. The 3D mode may refer to a collection of points in 3D space connected by various geometric entities (triangles, lines, curved surfaces, etc.,) representing a physical body. The 3D model may be a construct of several 3D models with positioning defined by relational interactions between geometric entities of different constituent models and/or the 3D environment. The projection plane may refer a region of 3D space as a viewport for translating views of 3D objects modeled in the 3D space into projections viewable on a display. The projection plane may be a defined region of 3D space and/or positionable relative to objects in the 3D space. The 3D modeler may refer to logic to construct, project, manipulate, and render 3D models in a 3D virtual environment from graphical data. The background layer may refer to the lowest ordered z-indexed layer of a technical drawing utilized for displaying an edge wireframe projection. In some embodiments, the feature identifiers may refer to graphical elements displayed in the defined feature foreground layer associated with a model feature.

In some embodiments, the projection view filter may refer to logic for identifying visibility of model features in an edge wireframe projection. The edge wireframe projection may refer to a two-dimensional image depicting a perspective of a three-dimensional object comprising edges identified from a 3D model and consistent with the depicted perspective. The export control may refer to a specification detailing the output parameters of a given image or view to ensure proper display on a graphical user interface. The cloud may refer to a computing infrastructure for sharing configurable storage and computing resources in a network of devices. The graphical projection may refer to 2D representation of a 3D objects in a 3D virtual environment on a plane.

In some embodiments, the hidden line removal logic may refer to instructional logic for detecting surface edges of 3D objects hidden by opaque surfaces when projecting the 3D object to a 2D plane. The mapping table may refer to logic operating a relational table for defining identified sub-regions of a 3D model as a model feature and mapping the model feature to a feature identifier. The model feature definition may refer to parameters defining or identifying a sub-region of the 3D model as a model feature. The feature mapper may refer to logic to configure a mapping table with a model feature definition defining a sub-region of the 3D model as a model feature and associating the model feature with a feature identifier.

In some embodiments, the output controller may refer to logic to generate, configure, and export an edge wireframe projection of a 3D model controlled by an export control from the user interface controller. The visible features list may refer to a list, tree or other data structure containing component parts or features of a 3D model visible in the edge wireframe projection. The orthogonal distance may refer to the measurement of a vector line drawn orthogonal to the projection play and coincident to a 3D coordinate corresponding to a projected edge or sub-region in an edge wireframe projection. The model view may refer to control parameters for configuring the positioning of the projection plane in the 3D virtual environment relative to the 3D model. The projection calculations may refer to calculations of two dimensional representations of three dimensional objects on or through a two-dimensional plane. The technical drawings viewer may refer to logic to generate a multilayered technical drawing from an edge wireframe projection and a projected components list through control of a constructor.

In some embodiments, A technical drawing may refer to a multilayered image for displaying projections of a 3D model on a 2D plane with an edge wireframe projection positioned on a lower z-indexed plane relative to a configurable foreground layer displaying component identifier. The user interface controller may refer to logic for generating control and configuration commands for device logic from defined user inputs and interactions. The defined feature foreground layer may refer to a higher ordered z-indexed layer positioned above an edge wireframe projection in a technical drawing allowing positioning of feature identifiers on or adjacent to a model feature of the edge wireframe projection.

DRAWINGS

Figure 1:
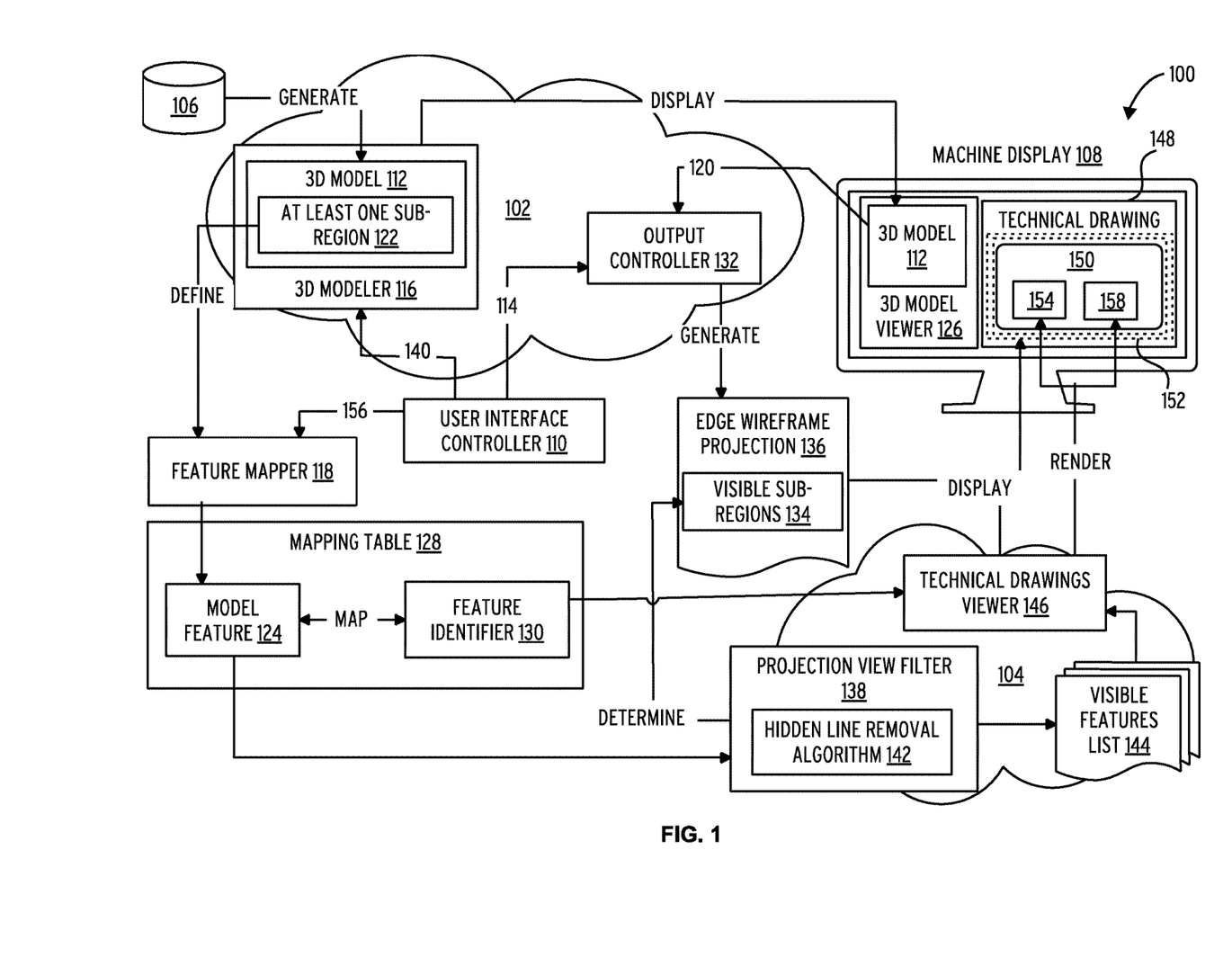
FIG. 1 illustrates an embodiment of a system for consistent identification of numbered elements in multi-layered views captured from a 3D model 100.

Referencing FIG. 1, a system for consistent identification of numbered elements in multi-layered views captured from a 3D model 100 comprises a machine display 108, first cloud 102, a controlled memory data structure 106, a mapping table 128, a second cloud 104, a 3D modeler 116, an output controller 132, a feature mapper 118, a user interface controller 110, a mapping table 128, a projection view filter 138, and a technical drawings viewer 146. The machine display 108 displays a 3D model viewer 126 displaying a 3D model 112, a technical drawing 148 displaying a background layer 152 and a defined feature foreground layer 150 comprising a feature identifier 154 and at least one lead line 158. The 3D modeler 116 generates a 3D model 112 for displaying in 3D model viewer 126. The 3D model 112 comprises at least one sub-region 122. The output controller 132 receives a model view 120 and an export control 114 and generates an edge wireframe projection 136 comprising a visible sub-regions 134. The user interface controller 110 configures the output controller 132 with an export control 114, a 3D modeler 116 with a 3D model control 140, and a feature mapper 118 with a model feature definition 156. The feature mapper 118 defines an at least one sub-region 122 as a model feature 124 in a mapping table 128. The mapping table 128 maps the model feature 124 to a feature identifier 130. The projection view filter 138 determines the visible sub-regions 134 in the edge wireframe projection 136 assocaited with a model feature 124. The projection view filter 138 may be operated using a hidden line removal algorithm 142. The projection view filter 138 generates a visible features list 144 for configuring a technical drawings viewer 146. The technical drawings viewer 146 displays the edge wireframe projection 136 as a background layer 152 in the technical drawing 148 though the machine display 108. The technical drawings viewer 146 retrieves feature identifier 130 and renders the feature identifier 154 and lead line 158 originating from visible sub-regions 134 in the defined feature foreground layer 150.

In an embodiment, the first cloud 102 comprises the 3D modeler 116 and the output controller 132. In an embodiment, the second cloud 104 comprises the projection view filter 138 and the technical drawings viewer 146.

Figure 2:
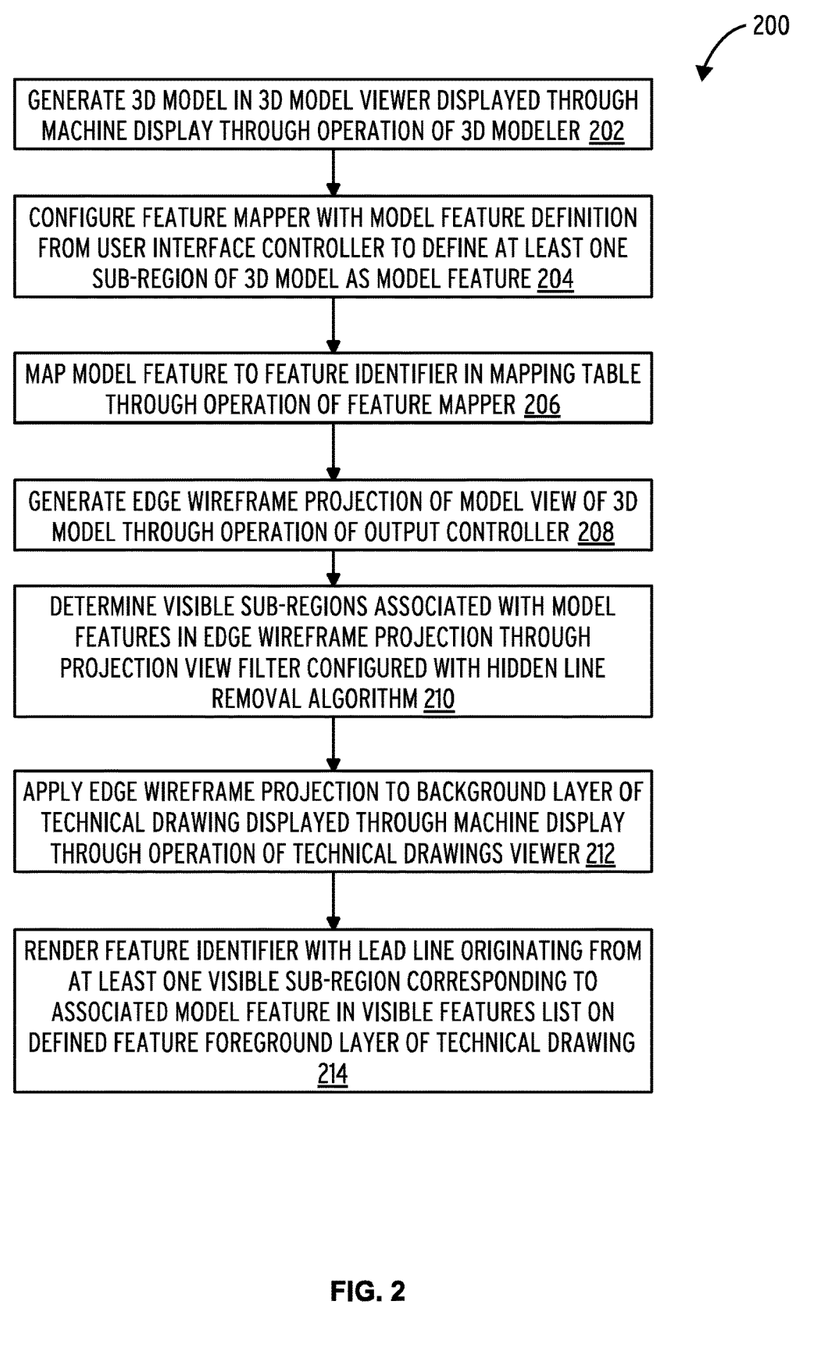
FIG. 2 illustrates an embodiment of a method 200 for consistent identification of numbered elements in multi-layered views captured from a 3D model
Figure 7:
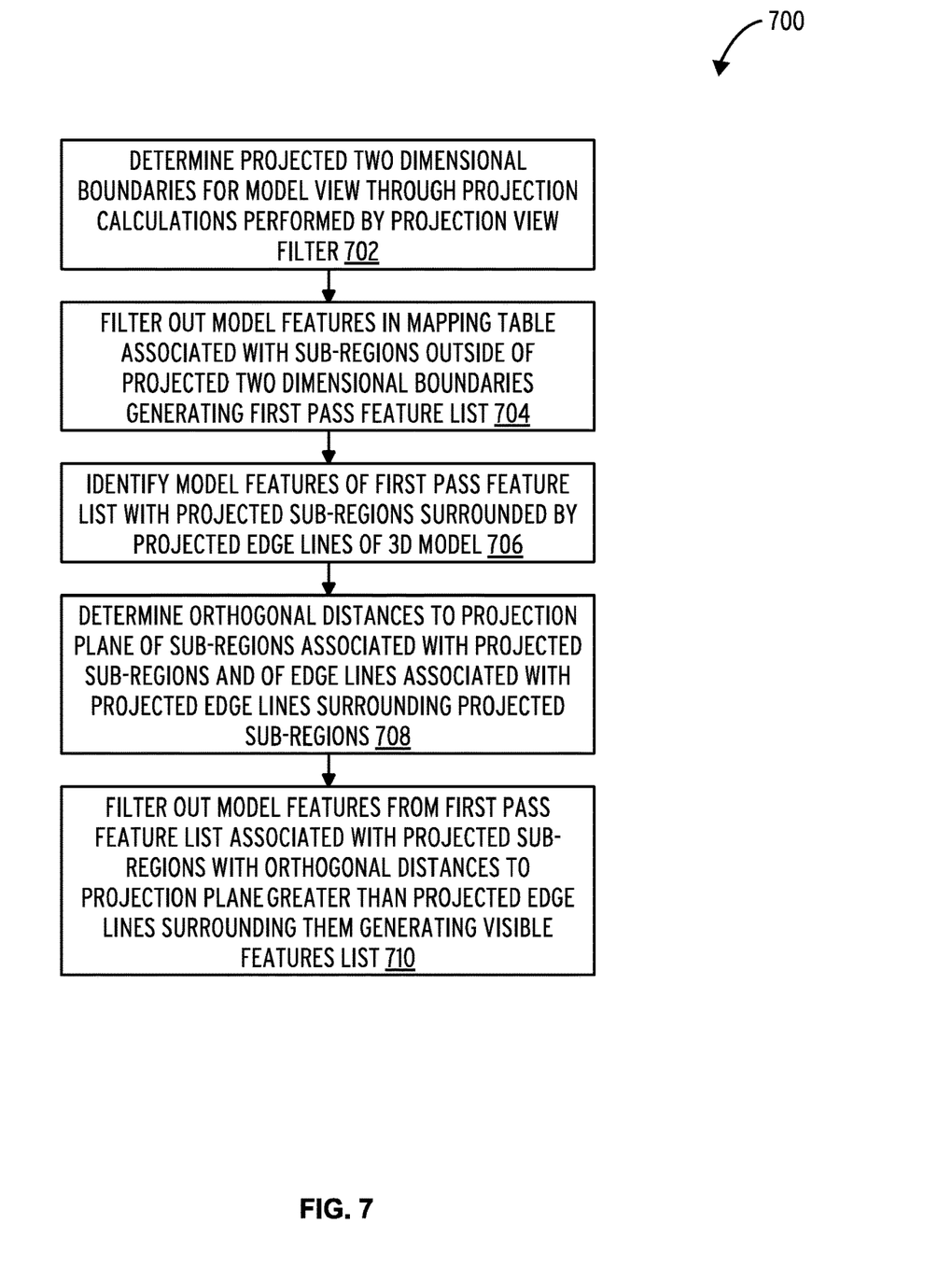
FIG. 7 illustrates an embodiment of a hidden line removal algorithm 700.

The system for consistent identification of numbered elements in multi-layered views captured from a 3D model 100 may be operated in accordance the processes described in FIG. 2 and FIG. 7.

Referencing FIG. 2, the method 200 generates a three dimensional (3D) model in a 3D model viewer displayed through a machine display through operation of a 3D modeler configured by a 3D model control from a user interface controller (block 202). In block 204, the method 200 configures a feature mapper with a model feature definition from the user interface controller to define at least one sub-region of the 3D model as a model feature. The method 200 maps the model feature to a feature identifier in a mapping table through operation of the feature mapper controlled by the model feature definition (block 206). The method 200 generates an edge wireframe projection of a model view of the 3D model through operation of an output controller configured by an export control received through the user interface controller (block 208). The method 200 determines visible sub-regions associated with model features in the edge wireframe projection through a projection view filter configured with a hidden line removal algorithm (block 210). The method 200 applies the edge wireframe projection to a background layer of a technical drawing displayed through the machine display through operation of a technical drawings viewer (block 212). In block 214, the method 200 renders the feature identifier with a lead line originating from at least one visible sub-region corresponding to an associated model feature in a visible features list on a defined feature foreground layer of the technical drawing through operation of the technical drawings viewer.

In some embodiments, the method 200 generates the 3D model in the 3D model viewer includes retrieving the 3D model from a controlled memory data structure through operation of the 3D modeler configured by the 3D model control on a first cloud.

In some embodiments, the controlled memory data structure comprises a cloud storage controlled memory data structure.

In some embodiments, the method 200 applies the edge wireframe projection to the background layer of the technical drawing comprises configuring the technical drawings viewer on a second cloud to receive the visible features list and the edge wireframe projection from the first cloud.

Method 200 sends and receives multiple controls from machines, allowing machine features to remotely interact with separate machines and generating views that may be displayed and manipulated on a machine display.

Figure 3:
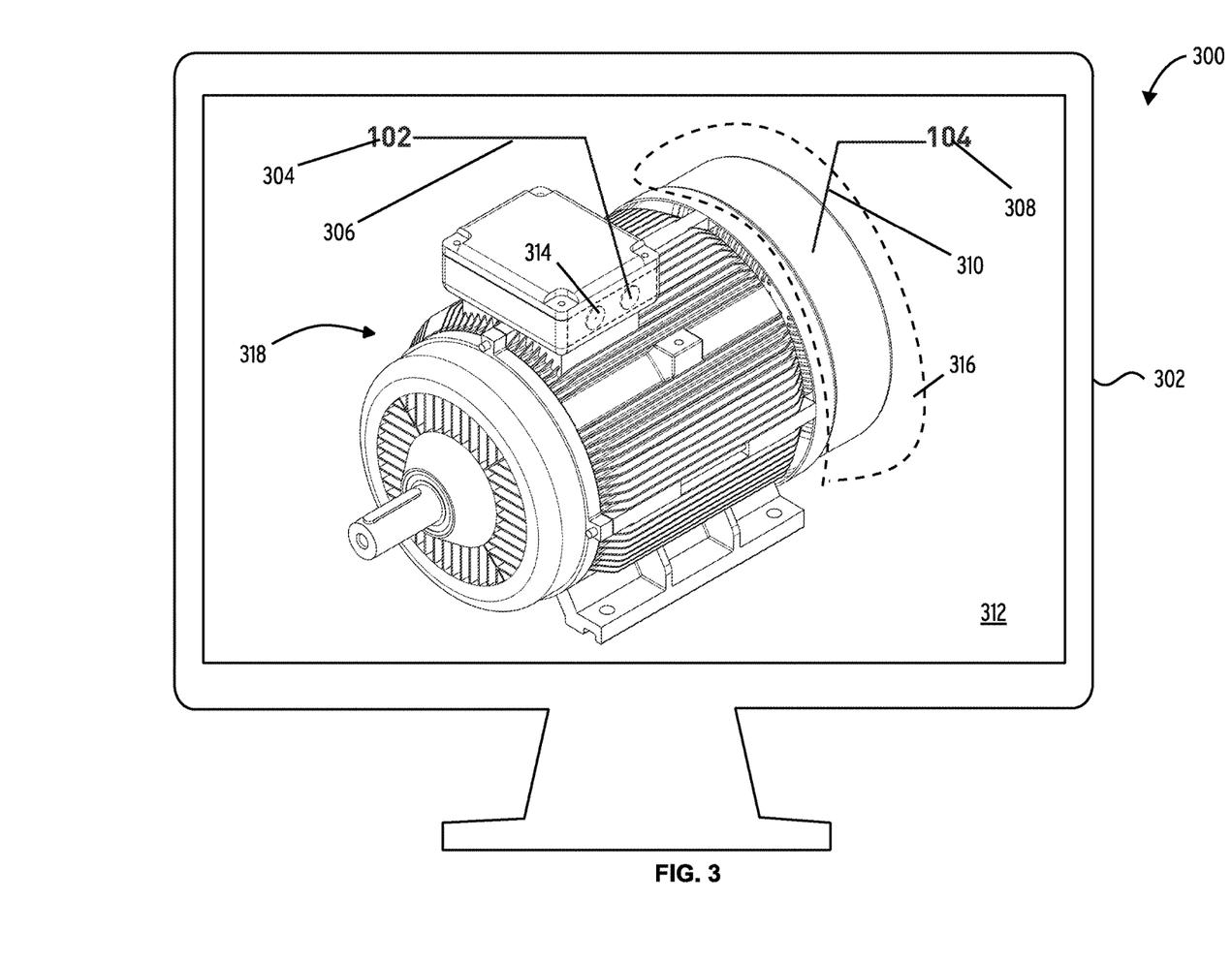
FIG. 3 illustrates an embodiment of a system for consistent identification of numbered elements in multi-layered views captured from a 3D model 300.

Referencing FIG. 3, a system for consistent identification of numbered elements in multi-layered views captured from a 3D model 300 comprises a machine display 302 displaying a front perspective view of a technical drawing 312. The front perspective view of a technical drawing 312 comprises an edge wireframe projection 318 comprising a projected subregion 314 and a visible subregion 316. The front perspective view of a technical drawing 312 shows a feature identifier 304 connected to lead line 306 pointing to the projected subregion 314. The front perspective view of a technical drawing 312 also shows a feature identifier 308 connected to lead line 310 pointing to visible subregion 316.

The system for consistent identification of numbered elements in multi-layered views captured from a 3D model 300 may be operated in accordance to the processes described in FIG. 2 and FIG. 7.

Figure 4:
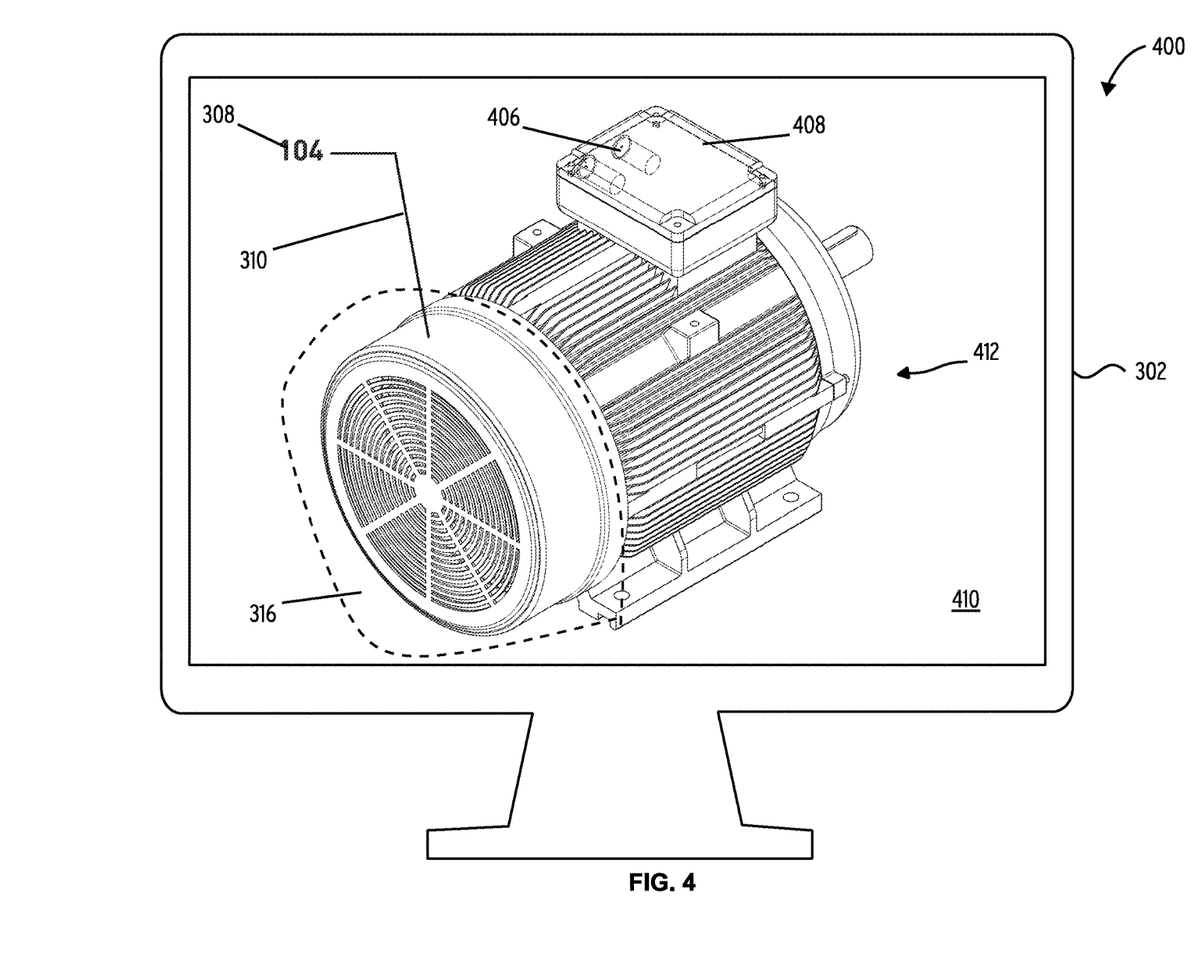
FIG. 4 illustrates an embodiment of a system for consistent identification of numbered elements in multi-layered views captured from a 3D model 400.

Referencing FIG. 4, a system for consistent identification of numbered elements in multi-layered views captured from a 3D model 400 comprises a machine display 302 displaying a rear perspective view of a technical drawing 410. The rear perspective view of a technical drawing 410 comprises an edge wireframe projection 412 comprising a visible subregion 316 with a feature identifier 308 connected to a lead line 310 pointing to the visible subregion 316. A model feature 406 corresponding to the projected subregion 314 in FIG. 3 is displayed without the feature identifier and the lead line as the projected edge lines 408 identify an occlusive surface in front of the model feature 406.

The system for consistent identification of numbered elements in multi-layered views captured from a 3D model 400 may be operated in accordance with the process described in FIG. 2 and FIG. 7.

Figure 5:
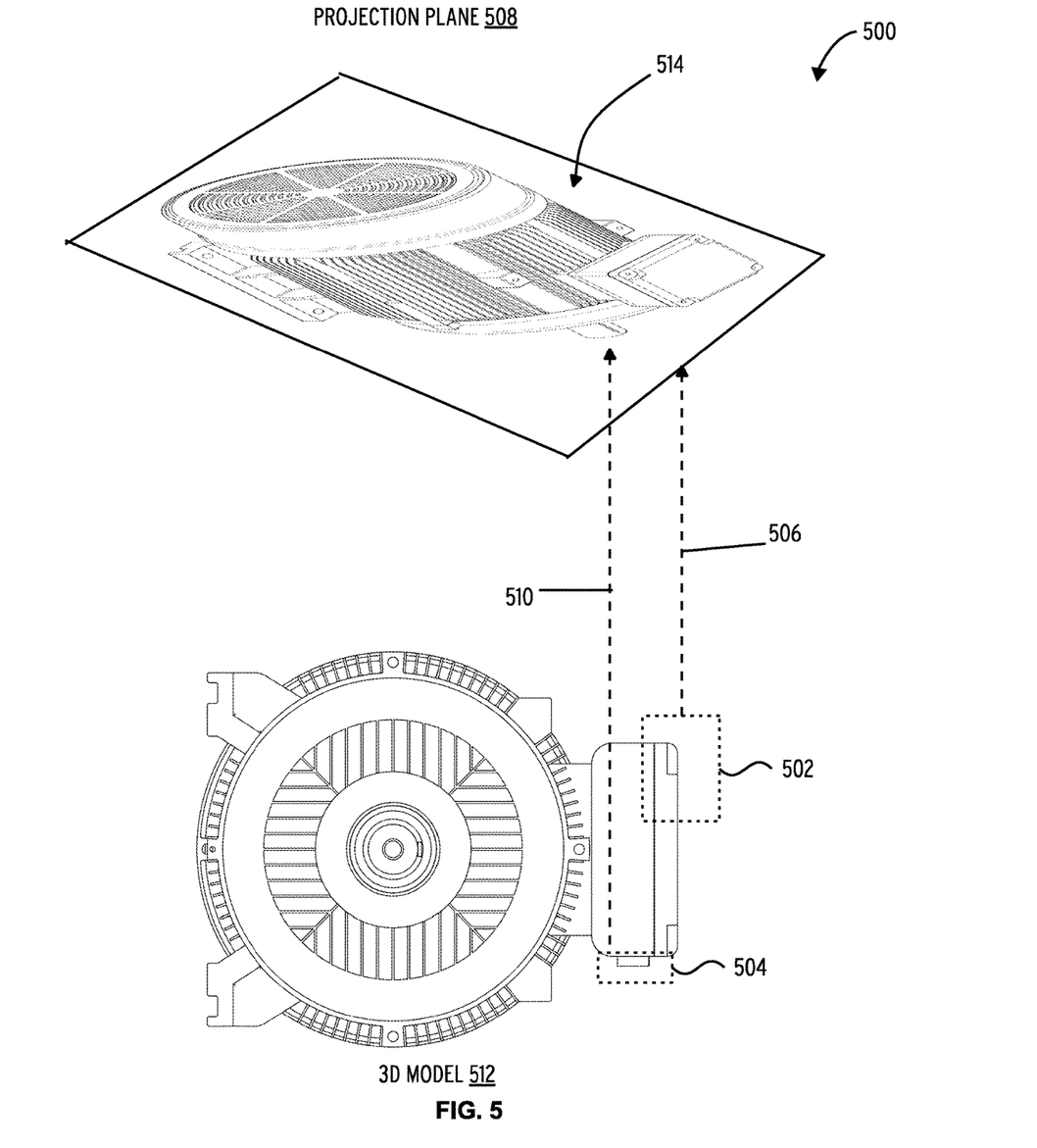
FIG. 5 illustrates an embodiment of a system 500 operating a projection view filter.

Referencing FIG. 5, a system 500 operating a projection view filter comprises a 3D model 512 and a projection plane 508. The projection plane 508 comprises an edge wireframe projection 514. The 3D model 512 comprises a projected subregion 504 and a projected edge lines 502. The projection view filter of system 500 identifies the orthogonal distance of projected subregion 510 to be greater than the orthogonal distance of projected edge lines 506 surrounding the projected subregion 504.

The system 500 may be operated in accordance to the process described in FIG. 2 and FIG. 7.

Figure 6:
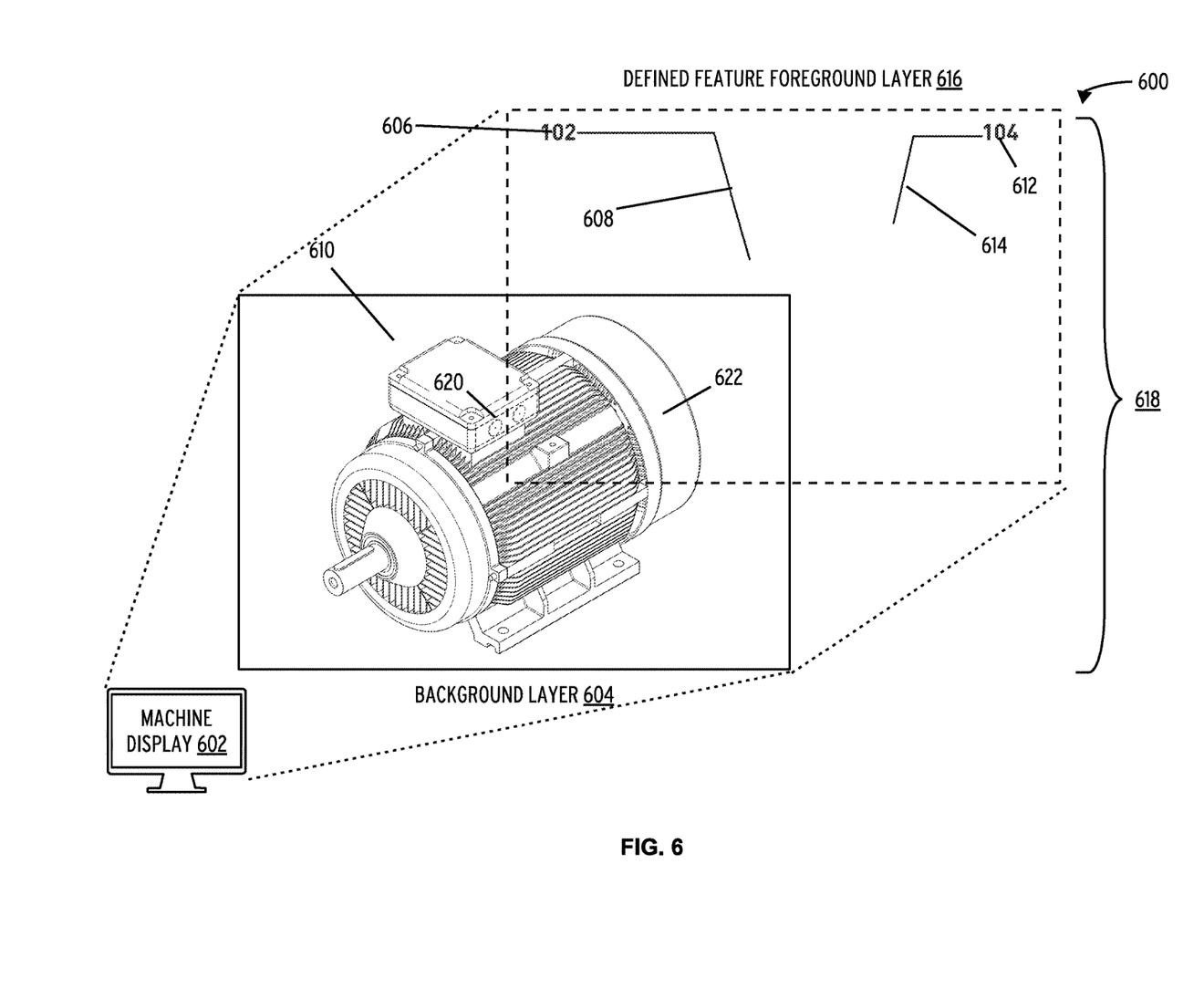
FIG. 6 illustrates an embodiment of system for consistent identification of numbered elements in multi-layered views captured from a 3D model 600.

Referencing FIG. 6, a system for consistent identification of numbered elements in multi-layered views captured from a 3D model 600 comprises a machine display 602 displaying a technical drawing 618. The technical drawing 618 comprises a background layer 604 and a defined feature foreground layer 616. The background layer 604 comprises an edge wireframe projection 610, The defined feature foreground layer 616 comprises a feature identifier 606 connected to lead line 608 and feature identifier 612 connected to lead line 614. The lead line 608 points to the visible subregion 620 of the edge wireframe projection 610. The lead line 614 points to the visible subregion 622 of the edge wireframe projection 610.

The system for consistent identification of numbered elements in multi-layered views captured from a 3D model 600 may be operated in accordance with the process described in FIG. 2 and FIG. 7.

Referencing FIG. 7, a hidden line removal algorithm 700 determines projected two dimensional boundaries for the model view through projection calculations performed by the projection view filter (block 702). In block 704, the hidden line removal algorithm 700 filters out the model features in the mapping table associated with sub-regions outside of the projected two dimensional boundaries generating a first pass feature list. The hidden line removal algorithm 700 identifies the model features of the first pass feature list with projected sub-regions surrounded by projected edge lines of the 3D model (block 706). In block 708, the hidden line removal algorithm 700 determines orthogonal distances to projection plane of sub-regions associated with the projected sub-regions and of edge lines associated with the projected edge lines surrounding the projected sub-regions. In block 710, the hidden line removal algorithm 700 filters out the model features from the first pass feature list associated with the projected sub-regions with the orthogonal distances to the projection plane, greater than the projected edge lines surrounding them generating the visible features list.

Figure 8:
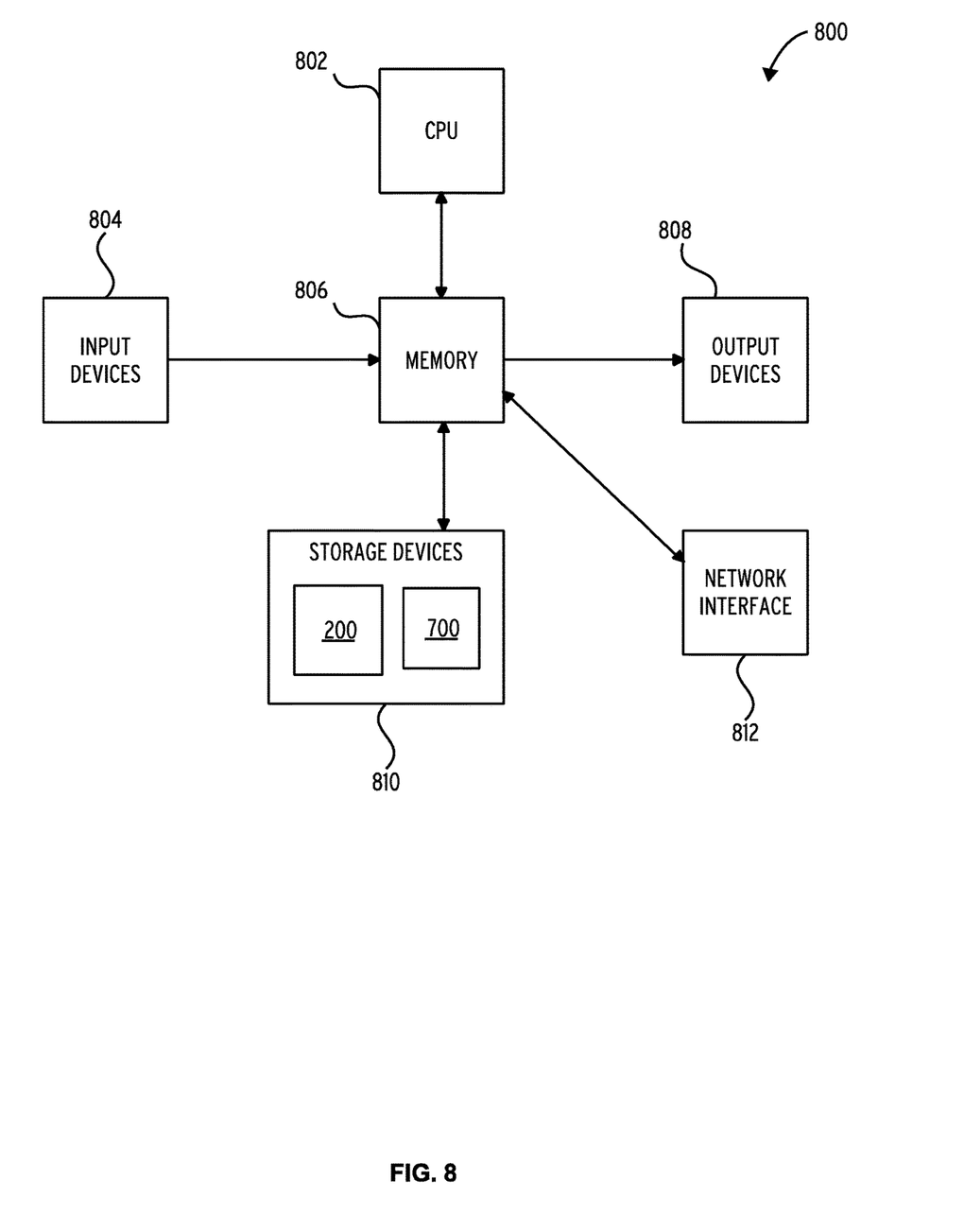
FIG. 8 illustrates an embodiment of a digital apparatus 800 to implement components and process steps of the system described herein.

FIG. 6 illustrates an embodiment of a digital apparatus 800 to implement components and process steps of the system described herein.

Input devices 804 comprise transducers that convert physical phenomenon into machine internal signals, typically electrical, optical or magnetic signals. Signals may also be wireless in the form of electromagnetic radiation in the radio frequency (RF) range but also potentially in the infrared or optical range. Examples of input devices 804 are keyboards which respond to touch or physical pressure from an object or proximity of an object to a surface, mice which respond to motion through space or across a plane, microphones which convert vibrations in the medium (typically air) into device signals, scanners which convert optical patterns on two or three dimensional objects into device signals. The signals from the input devices 804 are provided via various machine signal conductors (e.g., busses or network interfaces) and circuits to memory 806.

The memory 806 is typically what is known as a first or second level memory device, providing for storage (via configuration of matter or states of matter) of signals received from the input devices 804, instructions and information for controlling operation of the CPU 802, and signals from storage devices 810.

Information stored in the memory 806 is typically directly accessible to the CPU 802 of the device. Signals input to the device cause the reconfiguration of the internal material/energy state of the memory 806, creating in essence a new machine configuration, influencing the behavior of the digital apparatus 800 by affecting the behavior of the CPU 802 with control signals (instructions) and data provided in conjunction with the control signals.

Second or third level storage devices 810 may provide a slower but higher capacity machine memory capability. Examples of storage devices 810 are hard disks, optical disks, large capacity flash memories or other non-volatile memory technologies, and magnetic memories.

The CPU 802 may cause the configuration of the memory 806 to be altered by signals in storage devices 810. In other words, the CPU 802 may cause data and instructions to be read from storage devices 810 in the memory 806 from which may then influence the operations of CPU 802 as instructions and data signals, and from which it may also be provided to the output devices 808. The CPU 802 may alter the content of the memory 806 by signaling to a machine interface of memory 806 to alter the internal configuration, and then converted signals to the storage devices 810 to alter its material internal configuration. In other words, data and instructions may be backed up from memory 806, which is often volatile, to storage devices 810, which are often non-volatile.

Output devices 808 are transducers which convert signals received from the memory 806 into physical phenomenon such as vibrations in the air, or patterns of light on a machine display, or vibrations (i.e., haptic devices) or patterns of ink or other materials (i.e., printers and 3-D printers).

The network interface 812 receives signals from the memory 806 and converts them into electrical, optical, or wireless signals to other machines, typically via a machine network. The network interface 812 also receives signals from the machine network and converts them into electrical, optical, or wireless signals to the memory 806.

Those having skill in the art will appreciate that there are various logic implementations by which processes and/or systems described herein can be effected (e.g., hardware, software, or firmware), and that the preferred vehicle will vary with the context in which the processes are deployed. If an implementer determines that speed and accuracy are paramount, the implementer may opt for a hardware or firmware implementation; alternatively, if flexibility is paramount, the implementer may opt for a solely software implementation; or, yet again alternatively, the implementer may opt for some combination of hardware, software, or firmware. Hence, there are numerous possible implementations by which the processes described herein may be effected, none of which is inherently superior to the other in that any vehicle to be utilized is a choice dependent upon the context in which the implementation will be deployed and the specific concerns (e.g., speed, flexibility, or predictability) of the implementer, any of which may vary. Those skilled in the art will recognize that optical aspects of implementations may involve optically-oriented hardware, software, and or firmware.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

The foregoing detailed description has set forth various embodiments of the devices or processes via the use of block diagrams, flowcharts, or examples. Insofar as such block diagrams, flowcharts, or examples contain one or more functions or operations, it will be understood as notorious by those within the art that each function or operation within such block diagrams, flowcharts, or examples can be implemented, individually or collectively, by a wide range of hardware, software, firmware, or virtually any combination thereof. Portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more processing devices (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented, individually or collectively, by a wide range of hardware, software, firmware, or any combination thereof can be viewed as being composed of various types of circuitry.

Those skilled in the art will recognize that it is common within the art to describe devices or processes in the fashion set forth herein, and thereafter use standard engineering practices to integrate such described devices or processes into larger systems. At least a portion of the devices or processes described herein can be integrated into a network processing system via a reasonable amount of experimentation. Various embodiments are described herein and presented by way of example and not limitation.

What is claimed is:

1. The method comprises:
generating a three dimensional (3D) model in a 3D model viewer displayed through a machine display through operation of a 3D modeler configured by a 3D model control from a user interface controller, wherein generating the 3D model in the 3D model viewer comprises retrieving the 3D model from a controlled memory data structure through operation of the 3D modeler configured by the 3D model control on a first cloud:
configuring a feature mapper with a model feature definition from the user interface controller to define at least one sub-region of the 3D model as a model feature;
mapping the model feature to a feature identifier in a mapping table through operation of the feature mapper controlled by the model feature definition;
generating an edge wireframe projection of a model view of the 3D model through operation of an output controller configured by an export control received through the user interface controller;
determining visible sub-regions associated with model features in the edge wireframe projection through a projection view filter configured with a hidden line removal algorithm;
applying the edge wireframe projection to a background layer of a technical drawing displayed through the machine display through operation of a technical drawings viewer, wherein applying the edge wireframe projection to the background layer of the technical drawing comprises configuring the technical drawings viewer on a second cloud to receive a visible features list and the edge wireframe projection from the first cloud; and
rendering the feature identifier with a lead line originating from at least one visible sub-region corresponding to an associated model feature in the visible features list on a defined feature foreground layer of the technical drawing through operation of the technical drawings viewer.

2. The method of claim 1, wherein the controlled memory data structure comprises a cloud storage controlled memory data structure.

3. The method of claim 1, wherein determining the visible sub-regions associated with the model features in the edge wireframe projection through the projection view filter configured with the hidden line removal algorithm comprises:
 determining projected two dimensional boundaries for the model view through projection calculations performed by the projection view filter;
 filtering out the model features in the mapping table associated with sub-regions outside of the projected two dimensional boundaries generating a first pass feature list;
 identifying the model features of the first pass feature list with projected sub-regions surrounded by projected edge lines of the 3D model;
 determining orthogonal distances to projection plane of sub-regions associated with the projected sub-regions and of edge lines associated with the projected edge lines surrounding the projected sub-regions; and
 filtering out the model features from the first pass feature list associated with the projected sub-regions with the orthogonal distances to the projection plane, greater than the projected edge lines surrounding them generating the visible features list.

4. A non-transitory computer-readable storage medium, the computer-readable storage medium including instructions that when executed by a computer, cause the computer to:
 generate a three dimensional (3D) model in a 3D model viewer displayed through a machine display through operation of a 3D modeler configured by a 3D model control from a user interface controller, wherein generating the 3D model in the 3D model viewer comprises retrieving the 3D model from a controlled memory data structure through operation of the 3D modeler configured by the 3D model control on a first cloud;
 configure a feature mapper with a model feature definition from the user interface controller to define at least one sub-region of the 3D model as a model feature;
 map the model feature to a feature identifier in a mapping table through operation of the feature mapper controlled by the model feature definition;
 generate an edge wireframe projection of a model view of the 3D model through operation of an output controller configured by an export control received through the user interface controller;
 determine visible sub-regions associated with model features in the edge wireframe projection through a projection view filter configured with a hidden line removal algorithm;
 apply the edge wireframe projection to a background layer of a technical drawing displayed through the machine display through operation of a technical drawings viewer wherein applying the edge wireframe projection to the background layer of the technical drawing comprises configuring the technical drawings viewer on a second cloud to receive a visible features list and the edge wireframe projection from the first cloud; and
 render the feature identifier with a lead line originating from at least one visible sub-region corresponding to an associated model feature in the visible features list on a defined feature foreground layer of the technical drawing through operation of the technical drawings viewer.

5. The computer-readable storage medium of claim 4, wherein the controlled memory data structure comprises a cloud storage controlled memory data structure.

6. The computer-readable storage medium of claim 4, wherein determining the visible sub-regions associated with the model features in the edge wireframe projection through the projection view filter configured with the hidden line removal algorithm comprises:
 determine projected two dimensional boundaries for the model view through projection calculations performed by the projection view filter;
 filter out the model features in the mapping table associated with sub-regions outside of the projected two dimensional boundaries generating a first pass feature list;
 identify the model features of the first pass feature list with projected sub-regions surrounded by projected edge lines of the 3D model;
 determine orthogonal distances to projection plane of sub-regions associated with the projected sub-regions and of edge lines associated with the projected edge lines surrounding the projected sub-regions; and
 filter out the model features from the first pass feature list associated with the projected sub-regions with the orthogonal distances to the projection plane, greater than the projected edge lines surrounding them generating the visible features list.

7. A computing apparatus, the computing apparatus comprising:
 a processor; and
 a memory storing instructions that, when executed by the processor, configure the apparatus to:
 generate a three dimensional (3D) model in a 3D model viewer displayed through a machine display through operation of a 3D modeler configured by a 3D model control from a user interface controller, wherein generating the 3D model in the 3D model viewer comprises retrieving the 3D model from a controlled memory data structure through operation of the 3D modeler configured by the 3D model control on a first cloud;
 configure a feature mapper with a model feature definition from the user interface controller to define at least one sub-region of the 3D model as a model feature;
 map the model feature to a feature identifier in a mapping table through operation of the feature mapper controlled by the model feature definition;
 generate an edge wireframe projection of a model view of the 3D model through operation of an output controller configured by an export control received through the user interface controller;
 determine visible sub-regions associated with model features in the edge wireframe projection through a projection view filter configured with a hidden line removal algorithm;
 apply the edge wireframe projection to a background layer of a technical drawing displayed through the machine display through operation of a technical drawings viewer wherein applying the edge wireframe projection to the background layer of the technical drawing comprises configuring the technical drawings viewer on a second cloud to receive a visible features list and the edge wireframe projection from the first cloud; and
 render the feature identifier with a lead line originating from at least one visible sub-region corresponding to an associated model feature in the visible features list on a defined feature foreground layer of the technical drawing through operation of the technical drawings viewer.

8. The computing apparatus of claim 7, wherein the controlled memory data structure comprises a cloud storage controlled memory data structure.

9. The computing apparatus of claim 7, wherein determining the visible sub-regions associated with the model features in the edge wireframe projection through the projection view filter configured with the hidden line removal algorithm comprises:

determine projected two dimensional boundaries for the model view through projection calculations performed by the projection view filter;

filter out the model features in the mapping table associated with sub-regions outside of the projected two dimensional boundaries generating a first pass feature list;

identify the model features of the first pass feature list with projected sub-regions surrounded by projected edge lines of the 3D model;

determine orthogonal distances to projection plane of sub-regions associated with the projected sub-regions and of edge lines associated with the projected edge lines surrounding the projected sub-regions; and filter out the model features from the first pass feature list associated with the projected sub-regions with the orthogonal distances to the projection plane, greater than the projected edge lines surrounding them generating the visible features list.

* * * * *